(12) United States Patent
Baba

(10) Patent No.: US 11,118,566 B2
(45) Date of Patent: Sep. 14, 2021

(54) METHOD OF DIAGNOSING A WIND TURBINE POWER GENERATION FACILITY AND AUTOMATIC DIAGNOSIS DEVICE FOR WIND TURBINE POWER GENERATION FACILITY

(71) Applicant: MITSUBISHI HEAVY INDUSTRIES, LTD., Tokyo (JP)

(72) Inventor: Mitsuya Baba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 268 days.

(21) Appl. No.: 16/178,010

(22) Filed: Nov. 1, 2018

(65) Prior Publication Data

US 2020/0011294 A1    Jan. 9, 2020

(30) Foreign Application Priority Data

Jul. 3, 2018    (JP) .............................. JP2018-126715

(51) Int. Cl.
*F03D 7/02*    (2006.01)
*F03D 17/00*    (2016.01)

(52) U.S. Cl.
CPC ........... *F03D 7/0224* (2013.01); *F03D 17/00* (2016.05); *F05B 2260/70* (2013.01); *F05B 2260/80* (2013.01); *F05B 2270/328* (2013.01)

(58) Field of Classification Search
CPC .... F03D 7/0224; F03D 17/00; F05B 2260/70; F05B 2260/80; F05B 2270/328
See application file for complete search history.

(56) References Cited

U.S. PATENT DOCUMENTS 8,270,667 B2    9/2012    Fritz et al.
2007/0081896 A1    4/2007    Mollhagen
(Continued)

FOREIGN PATENT DOCUMENTS

CN    105134510 A    12/2015
EP    1 816 346 A2    8/2007
(Continued)

OTHER PUBLICATIONS

Japan Patent Office, "Decision of Rejection for Japanese Patent Application No. 2018-126715," dated Jan. 28, 2020.
(Continued)

*Primary Examiner* — David E Sosnowski
*Assistant Examiner* — Sabbir Hasan
(74) *Attorney, Agent, or Firm* — Manabu Kanesaka; Kenneth Berner; Benjamin Hauptman

(57) ABSTRACT

Soundness and a sign of abnormality of a pitch mechanism of a wind turbine blade is quantitatively diagnosed. A method of diagnosing a wind turbine power generation facility includes the steps of: rotating and fixing a wind turbine rotor including at least one wind turbine blade; providing, in a state where the wind turbine rotor is fixed, a pitch control command value to a pitch mechanism that changes a pitch angle of the wind turbine blade, to increase or reduce the pitch angle such that the pitch angle reaches a pitch angle target value from a reference angle; acquiring an actual pitch angular velocity or an actual pitch angle of the wind turbine blade corresponding to the pitch control command value; and diagnosing soundness of the pitch mechanism based on correlation between the acquired actual pitch angular velocity or the acquired actual pitch angle, and the pitch control command value.

15 Claims, 7 Drawing Sheets

(56) References Cited

U.S. PATENT DOCUMENTS

2011/0158805 A1\* 6/2011 Miranda ................. F03D 17/00
                                                    416/1
2011/0181045 A1   7/2011 Letas et al.
2015/0337802 A1\* 11/2015 Su ......................... F03D 7/0224
                                                    416/1
2016/0010628 A1   1/2016 Dhar et al.

FOREIGN PATENT DOCUMENTS

JP    2017-044088 A      3/2017
JP     2017044088 A  \*   3/2017
WO   2009/146848 A2     12/2009

OTHER PUBLICATIONS

Japan Patent Office, "Office Action for Japanese Patent Application No. 2018-126715," dated Nov. 17, 2020.
Japan Patent Office, "Office Action for Japanese Patent Application No. 2018-126715," dated Jul. 23, 2019.

\* cited by examiner

COMPARATIVE VALVE CHECK FUNCTION    EXAMPLE OF DATA

EXAMPLE OF BLADE IN NORMAL STATE

EXAMPLE OF BLADE IN ABNORMAL STATE

METHOD OF DIAGNOSING A WIND TURBINE POWER GENERATION FACILITY AND AUTOMATIC DIAGNOSIS DEVICE FOR WIND TURBINE POWER GENERATION FACILITY

TECHNICAL FIELD

This disclosure relates to a method of diagnosing a wind turbine power generation facility and an automatic diagnosis device for a wind turbine power generation facility.

BACKGROUND

Various conventional methods of diagnosing a wind turbine power generation facility have been known.

For example, Patent Document 1 discloses a technique of a pitch mechanism for a wind turbine blade in which power supplied to a single pitch driving actuator is switched between an operation mode and a test mode so that a high stress test can be conducted without additionally providing an actuator for the test.

CITATION LIST

Patent Literature

Patent Document 1: WO 2009/146848 (Specification)

SUMMARY

A pitch mechanism for a wind turbine blade might involve abnormality such as a pitch behavior failing to follow what is indicated by a command value, as a result of degradation due to operations over time. Thus, abnormality or a sign of the abnormality is desired to be quantitatively detected for each wind turbine blade.

Patent Document 1 discloses no specific configuration for achieving such a task.

In view of the above, an object of at least one embodiment of the disclosure is to enable soundness or a sign of abnormality of a pitch mechanism of a wind turbine blade to be quantitatively analyzed.

(1) A method of diagnosing a wind turbine power generation facility according to at least one embodiment of the disclosure include the steps of:

rotating and fixing a wind turbine rotor including at least one wind turbine blade;

providing, in a state where the wind turbine rotor is fixed, a pitch control command value to a pitch mechanism that changes a pitch angle of the wind turbine blade, to increase or reduce the pitch angle such that the pitch angle reaches a pitch angle target value from a reference angle;

acquiring an actual pitch angular velocity or an actual pitch angle of the wind turbine blade corresponding to the pitch control command value; and diagnosing soundness of the pitch mechanism based on correlation between the acquired actual pitch angular velocity or the acquired actual pitch angle, and the pitch control command value.

With the method in (1) described above, in a state where the wind turbine rotor is fixed after rotation, the pitch control command value is provided to the pitch mechanism to increase or reduce the pitch angle such that the pitch angle reaches the pitch angle target value from the reference angle, and the actual pitch angular velocity or the actual pitch angle of the wind turbine blade changed in accordance with the pitch control command value is received from the sensor. Then, the controller diagnoses the soundness of the pitch mechanism based on the correlation between the acquired actual pitch angular velocity or the acquired actual pitch angle, and the pitch control command value. Thus, the soundness and a sign of abnormality of the pitch mechanism can be quantitatively diagnosed in both of increasing and reducing directions of the pitch angle with respect to the reference angle, based on the correlation between the pitch control command value and the actual pitch angular velocity or the actual pitch angle. When the acquired actual pitch angular velocity or the actual pitch angle does not reach or deviates from the pitch control command value, the pitch control command value is adjusted for correction. In this manner, the soundness of the pitch mechanism can be diagnosed.

(2) In some embodiments, in the method according to (1) described above, the step of fixing the wind turbine rotor may include fixing the wind turbine blade that is a diagnosis target, along a vertical direction including a center of the wind turbine rotor.

With the method in (2) described above, the soundness of the pitch mechanism can be diagnosed in a state where the wind turbine blade that is the diagnosis target is fixed along the vertical direction including the center of the wind turbine rotor. Thus, the soundness of the pitch mechanism can be diagnosed with the rotational axis of the wind turbine blade related to the pitch angle change extending along the vertical direction, and thus can be more accurately diagnosed with an influence due to a gravity component attributable to the own weight of the wind turbine blade with respect to the pitch angle change eliminated for example.

(3) In some embodiments, in the method according to (1) or (2) described above, the pitch angle target value or the pitch control command value may be provided in a form of a sine wave.

With the method in (3) described above, the pitch angle target value or the pitch control command value is provided to the pitch mechanism in a form of a sine wave, so that a basic waveform that can be easily compared can be used for diagnosing the soundness of the pitch mechanism, that is, whether an abnormality is present or a level of the abnormality in both of the increasing and reducing directions of the pitch angle with respect to the reference angle. Note that the pitch control command value may not result in a form of a sine wave.

(4) In some embodiments, the method according to any one of (1) to (3) described above may further include a step of setting a first threshold related to the correlation between the actual pitch angular velocity and the pitch control command value, and the step of diagnosing may include diagnosing abnormality when the correlation between the actual pitch angular velocity and the pitch control command value deviates from the first threshold.

With the method in (4) described above, the soundness of the pitch mechanism in terms of pitch angular velocity can be more effectively diagnosed quantitatively, by determining whether the correlation between the actual pitch angular velocity and the pitch control command value deviates from the first threshold. For example, the first threshold may be set to be an allowable value or the like of the actual pitch angular velocity with respect to the pitch control command value. Thus, whether the actual pitch angular velocity is within an allowable normal range covering tolerance, assembly error, and the like can be easily diagnosed.

(5) In some embodiments, the method according to any one of (1) to (4) described above may further include a step of setting a second threshold related to the correlation between the actual pitch angle and the pitch control command value, and the step of diagnosing may include diagnosing abnormality when the correlation between the actual pitch angle and the pitch control command value deviates from the second threshold.

With the method in (5) described above, the soundness of the pitch mechanism in terms of pitch angle can be more effectively diagnosed quantitatively, by determining whether the correlation between the actual pitch angle and the pitch control command value deviates from the second threshold. For example, the second threshold may be set to be an allowable value or the like of the actual pitch angle with respect to the pitch control command value. Thus, whether the actual pitch angular is within an allowable normal range covering tolerance, assembly error, and the like can be easily diagnosed.

(6) In some embodiments, in the method according to any one of (1) to (5) described above, the step of providing the pitch control command value may include providing the pitch control command value such that the pitch angle changes toward an amplitude range that is 10% to 50% of an entire pitch angle range between a feather side and a fine side.

With the method in (6) described above, the pitch control command value is provided to the pitch mechanism such that the pitch angle changes toward an amplitude range that is 10% to 50% of the entire pitch angle range between the feather side and the fine side. Thus, the soundness of the pitch mechanism can be diagnosed more simply and within a shorter period of time, compared with a case where the pitch angle changes over the entire pitch angle range between the feather side and the fine side. For example, the soundness of the pitch mechanism can selectively and preferentially be diagnosed for a region involving a relatively high use frequency during the operation, a pitch angle range including a pitch angle involving a relatively high risk of abnormality, and the like.

(7) In some embodiments, in the method according to any one of (1) to (6) described above, the step of providing the pitch control command value may include providing the pitch control command value such that the pitch angle changes toward a frequency range from 0.04 to 0.2 Hz.

With the method in (7) described above, the soundness of the pitch mechanism is diagnosed with the pitch angle changed toward the frequency range from 0.04 to 0.2 Hz. Thus, the soundness of the pitch mechanism can be diagnosed at any frequency within 0.04 to 0.2 Hz. Thus, for example, behavior as a result of changing the pitch angle at different frequencies can be recognized, whereby the soundness can be diagnosed more accurately.

(8) In some embodiments, in the method according to any one of (1) to (7) described above, the step of providing the pitch control command value may include providing the pitch control command value such that the pitch angle changes toward a cycle range from 5 to 25 seconds.

With the method in (8) described above, the soundness of the pitch mechanism is diagnosed with the pitch angle changed toward the cycle range from 5 to 25 seconds. Thus, the soundness of the pitch mechanism can be diagnosed at any cycle within 5 to 25 seconds. Thus, for example, behavior as a result of changing the pitch angle at different cycles can be recognized, whereby the soundness can be diagnosed more accurately.

(9) An automatic diagnosis device for a wind turbine power generation facility that comprises:

a wind turbine rotor including at least one wind turbine blade; and a pitch mechanism that changes a pitch angle of the wind turbine blade, according to at least one embodiment of the disclosure includes:

a sensor that acquires an actual pitch angular velocity or an actual pitch angle of the wind turbine blade; and a controller that controls driving of at least the pitch mechanism and the wind turbine rotor, wherein the controller is configured to provide, in a state where the wind turbine rotor is fixed, a pitch control command value to the pitch mechanism to increase or reduce the pitch angle such that the pitch angle reaches a pitch angle target value from a reference angle, acquire, from the sensor, the actual pitch angular velocity or the actual pitch angle of the wind turbine blade corresponding to the pitch control command value, and diagnose soundness of the pitch mechanism based on correlation between the acquired actual pitch angular velocity or the acquired actual pitch angle, and the pitch control command value.

With the configuration in (9) described above, as in (1) described above, in a state where the wind turbine rotor is fixed after rotation, the controller provides the pitch control command value to the pitch mechanism to increase or reduce the pitch angle such that the pitch angle reaches the pitch angle target value from the reference angle, and the actual pitch angular velocity or the actual pitch angle of the wind turbine blade changed in accordance with the pitch control command value is received from the sensor. Then, the controller diagnoses the soundness of the pitch mechanism based on the correlation between the acquired actual pitch angular velocity or the acquired actual pitch angle, and the pitch control command value. Thus, the soundness and a sign of abnormality of the pitch mechanism can be quantitatively diagnosed in both of increasing and reducing directions of the pitch angle with respect to the reference angle, based on the correlation between the pitch control command value and the actual pitch angular velocity or the actual pitch angle. When the acquired actual pitch angular velocity or the actual pitch angle does not reach or deviates from the pitch control command value, the pitch control command value is adjusted for correction. In this manner, the soundness of the pitch mechanism can be diagnosed.

(10) In some embodiments, in the configuration in (9) described above, the controller may be configured to fix the wind turbine blade that is a diagnosis target, along a vertical direction including a center of the wind turbine rotor.

With the configuration in (10) described above, as in (2) described above, the controller can diagnose the soundness of the pitch mechanism in a state where the wind turbine blade that is the diagnosis target is fixed along the vertical direction including the center of the wind turbine rotor. Thus, the soundness of the pitch mechanism can be diagnosed with the rotational axis of the wind turbine blade, related to the pitch angle change, extending along the vertical direction, and thus can be more accurately diagnosed with an influence due to a gravity component attributable to the own weight of the wind turbine blade with respect to the pitch angle change eliminated for example.

(11) In some embodiments, in the configuration in (9) or (10) described above, the controller may be configured to provide, to the pitch mechanism, the pitch angle target value or the pitch control command value in a form of a sine wave.

With the configuration in (11) described above, as in (3) described above, the pitch angle target value or the pitch control command value is provided to the pitch mechanism in a form of a sine wave, so that a basic waveform that can be easily compared can be used for diagnosing the soundness of the pitch mechanism, that is, whether an abnormality is present or a level of the abnormality in both of the increasing and reducing directions of the pitch angle with respect to the reference angle. Note that the pitch control command value may not result in a form of a sine wave.

(12) In some embodiments, in the configuration in any one of (9) to (11) described above, the automatic diagnosis device for a wind turbine power generation facility may further include a storage unit that stores a first threshold related to the correlation between the actual pitch angular velocity and the pitch control command value, or a second threshold related to the correlation between the actual pitch angle and the pitch control command value, and the controller may be configured to diagnose abnormality when the correlation between the actual pitch angular velocity and the pitch control command value deviates from the first threshold or when the correlation between the actual pitch angle and the pitch control command value deviates from the second threshold.

With the configuration in (12) described above, as in (4) or (5) described above, the soundness of the pitch mechanism in terms of pitch angular velocity can be quantitatively diagnosed more effectively, by determining whether the correlation between the actual pitch angular velocity and the pitch control command value deviates from the first threshold. Furthermore, the soundness of the pitch mechanism in terms of pitch angle can be more effectively diagnosed quantitatively, by determining whether the correlation between the actual pitch angle and the pitch control command value deviates from the second threshold. For example, the first threshold may be set to be an allowable value of the actual pitch angular velocity with respect to the pitch control command value. Thus, whether the actual pitch angular velocity is within an allowable normal range covering tolerance, assembly error, and the like can be easily diagnosed. For example, the second threshold may be set to be an allowable value of the actual pitch angle with respect to the pitch control command value. Thus, the whether the actual pitch angle is within an allowable normal range covering tolerance, assembly error, and the like can be easily diagnosed.

(13) In some embodiments, in the configuration in any one of (9) to (12) described above, the controller may be configured to provide the pitch control command value such that the pitch angle changes toward an amplitude range that is 10% to 50% of an entire pitch angle range between a feather side and a fine side.

With the configuration in (13) described above, as in (6) described above, the controller provides the pitch control command value to the pitch mechanism such that the pitch angle changes toward an amplitude range that is 10% to 50% of the entire pitch angle range between the feather side and the fine side. Thus, the soundness of the pitch mechanism can be diagnosed more simply and within a shorter period of time, compared with a case where the pitch angle changes over the entire pitch angle range between the feather side and the fine side. For example, the soundness of the pitch mechanism can selectively and preferentially be diagnosed for a region involving a relatively high use frequency during the operation, a pitch angle range including a pitch angle involving a relatively high risk of abnormality, and the like.

(14) In some embodiments, in the configuration in any one of (9) to (13) described above, the controller may be configured to provide the pitch control command value such that the pitch angle changes toward a frequency range from 0.04 to 0.2 Hz.

With the configuration in (14) described above, the soundness of the pitch mechanism is diagnosed with the controller changing the pitch angle toward the frequency range from 0.04 to 0.2 Hz. Thus, the soundness of the pitch mechanism can be diagnosed at any frequency within 0.04 to 0.2 Hz. Thus, behavior as a result of changing the pitch angle at different frequencies can be recognized, whereby the soundness can be diagnosed more accurately.

(15) In some embodiments, the configuration in any one of (9) to (14) described above, may further include a notification unit that issues a notification related to soundness of the pitch mechanism, and the controller may be configured to perform the diagnosis once in every predetermined cycle, and cause, when abnormality of the pitch mechanism of the at least one wind turbine blade is found, the notification unit to issue a notification indicating the abnormality.

With the configuration in (15) described above, the controller performs diagnoses the soundness of the pitch mechanism once in every predetermined cycle, and when abnormality of the pitch mechanism of the at least one wind turbine blade is found, the notification unit issues a notification indicating the abnormality.

According to at least one embodiment of the disclosure soundness and a sign of abnormality of a pitch mechanism of a wind turbine blade can be quantitatively analyzed.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, expressions that represent relative or absolute arrangements such as "in a direction", "along a direction", "parallel", "perpendicular", "center", "concentric", or "coaxial" refer not only to what exactly these expressions represent but also to states that allow tolerance or are relatively displaced by such a degree of angle or distance that can achieve the same functions.

For example, expressions on shapes such as rectangular or cylindrical refer not only to shapes such as rectangular or cylindrical in a geometrically exact sense but also to such shapes that include protrusions, recesses, chamfered parts, or the like as long as the same functions are available.

Expressions that represent "comprising", "including", "being provided with", "with", or "having" one component are not exclusive expressions that would exclude the existence of other component(s).

First of all an automatic diagnosis device for a wind turbine power generation facility according to at least one embodiment of the disclosure is described.

Figure 1:
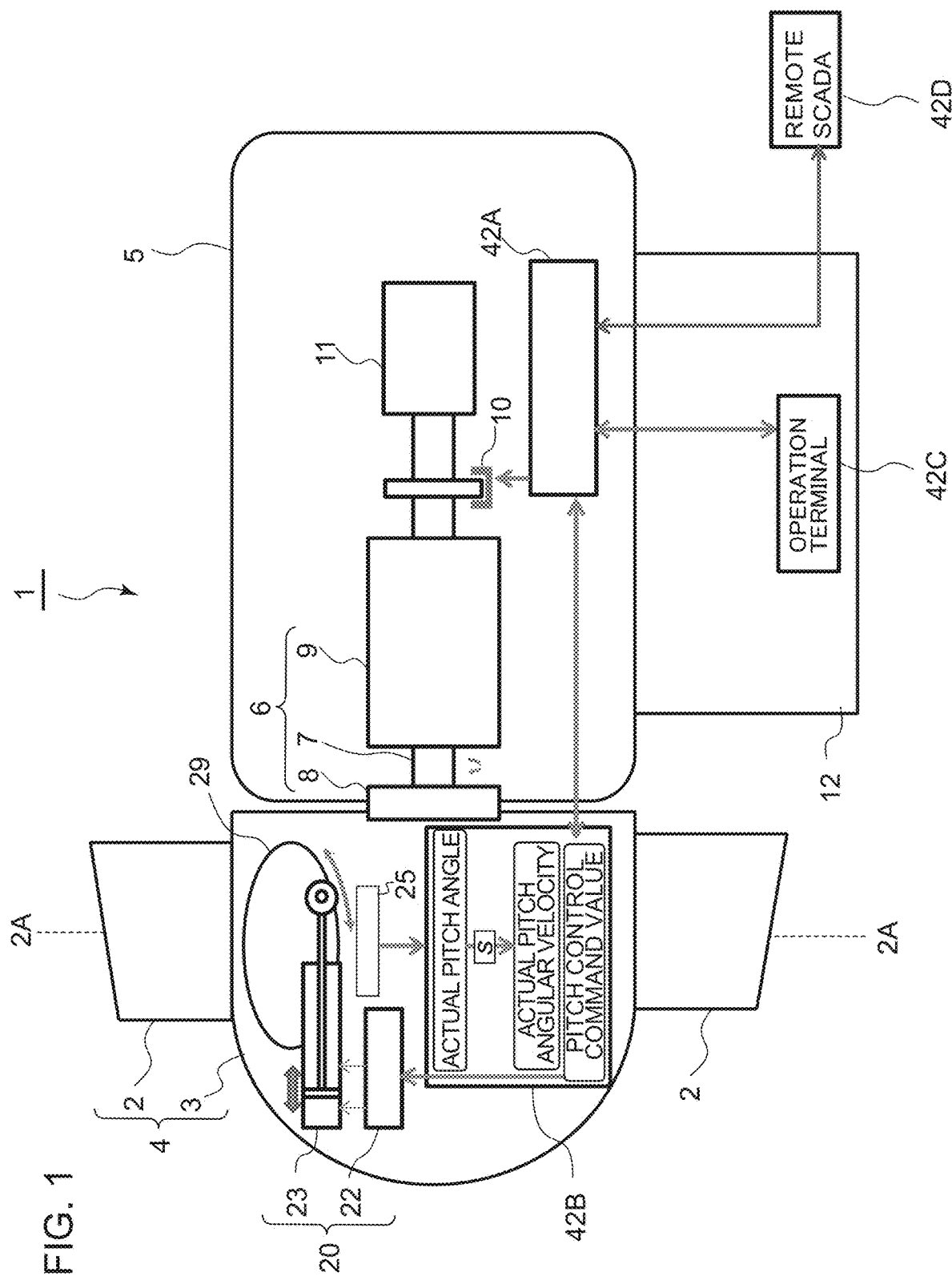
FIG. 1 is a schematic view illustrating a configuration example of a wind turbine power generation facility according to at least one embodiment of the disclosure.
Figure 2:
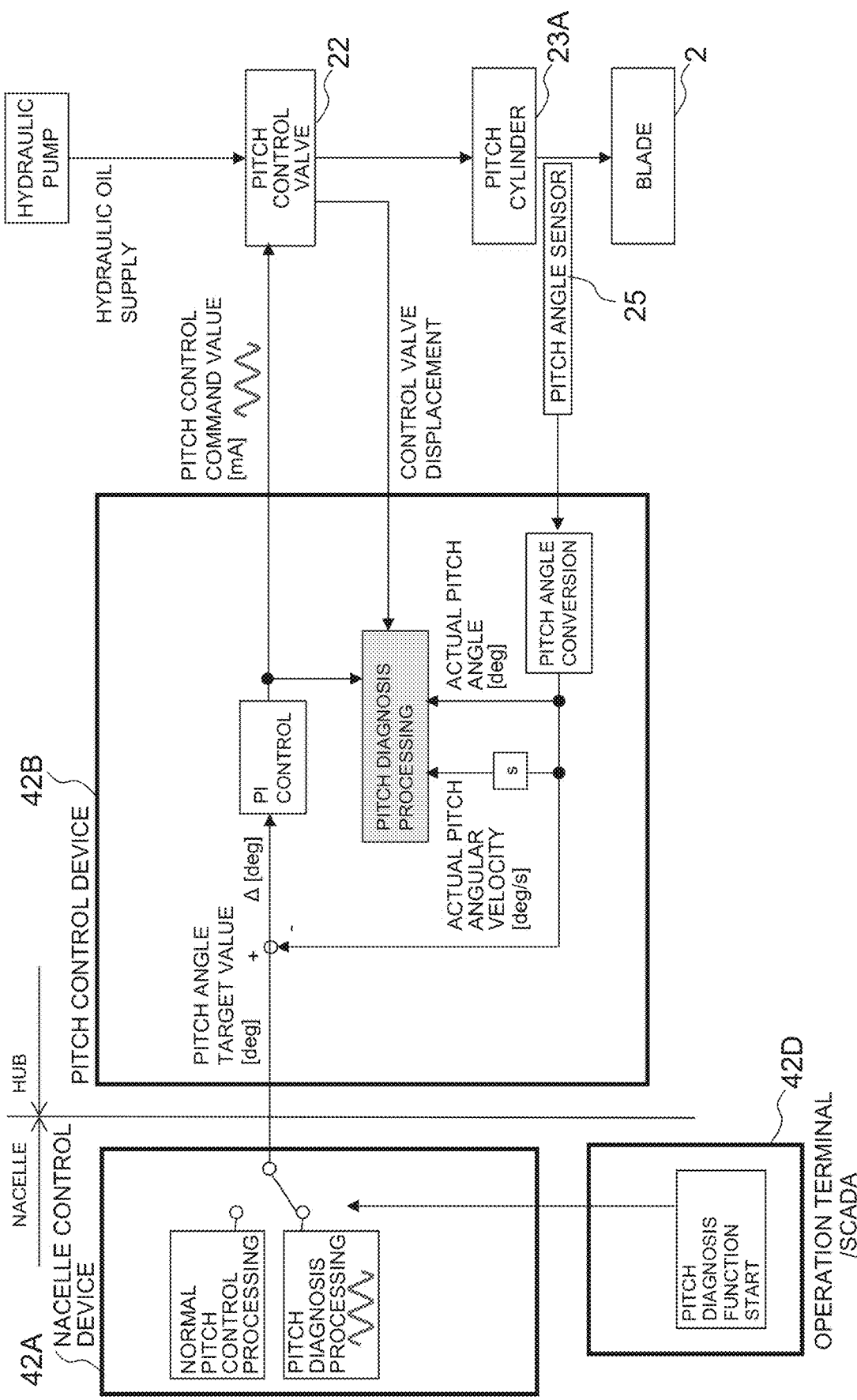
FIG. 2 is a block diagram illustrating a configuration example of a control system related to pitch diagnosis processing (hydraulic pitch) according to one embodiment.
Figure 3:
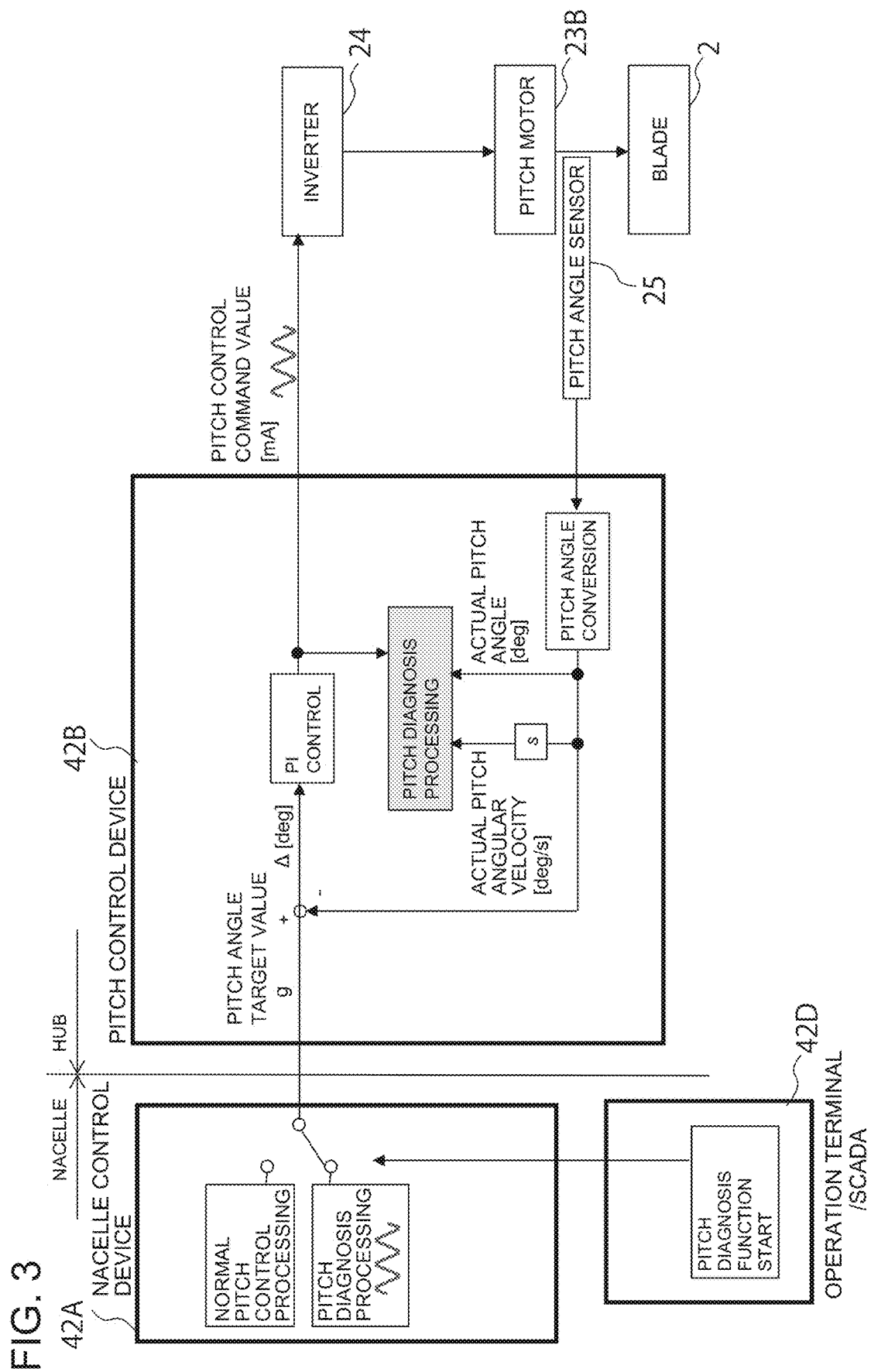
FIG. 3 is a block diagram illustrating a configuration example of a control system related to pitch diagnosis processing (electric pitch) according to another embodiment.

FIG. 1 is a schematic view illustrating a configuration example of a wind turbine power generation facility according to at least one embodiment of the disclosure. FIG. 2 is a block diagram illustrating a configuration example of a control system related to pitch diagnosis processing (hydraulic pitch) according to one embodiment. FIG. 3 is a block diagram illustrating a configuration example of a control system related to pitch diagnosis processing (electric pitch) according to another embodiment.

As in a nonlimiting example illustrated in FIG. 1 and FIG. 2, the wind turbine power generation facility (hereinafter, referred to as a wind turbine 1) includes: a wind turbine rotor 4 including at least one (for example, three) wind turbine blade 2 and a hub 3 to which the wind turbine blade 2 is attached; a pitch mechanism 20 that changes a pitch angle of the wind turbine blade 2; a nacelle 5 that rotatably supports the wind turbine rotor 4 via a drive train 6 including a main shaft 7 integrally rotatably coupled to the wind turbine rotor 4, a main shaft bearing 8, and an accelerator 9; a generator 11 that generates power by converting rotational energy, generated by the drive train 6, into electrical energy; a tower 12 that supports the nacelle 5 yaw-rotatably; and a platform (not illustrated) on which the tower 12 is installed. The main shaft 7 can be braked by a main shaft brake 10. With the main shaft brake 10, the wind turbine rotor 4 can be released to be rotatable, or may be stopped and held (fixed) at any azimuth angle.

An automatic diagnosis device 40 for a wind turbine power generation facility according to at least one embodiment of the disclosure includes: a sensor 25 (for example, a pitch angle sensor) that acquires an actual pitch angular velocity or an actual pitch angle of the wind turbine blade 2; and a controller 42 that controls driving of at least the pitch mechanism 20 and the wind turbine rotor 4 (see FIG. 1).

For example, the pitch mechanism 20 uses a driving force transmission mechanism (for example, a link mechanism (in a case of a hydraulic system), a gear mechanism (in a case of an electric system) including a pinion, or the like) including a hydraulic or electric pitch actuator 23 to apply rotational force, about a rotational axis 2A (see FIG. 1), to a blade root portion of the wind turbine blade 2. Here, the rotational axis 2A extends along a spanwise direction, the blade root portion is rotatably coupled inside the hub 3 via a bearing, and the rotational force is applied through a blade rotating ring (also referred to as a top plate) 29 coupled to the blade root portion. With this configuration, the pitch mechanism 20 can change or maintain the pitch angle of the wind turbine blade 2.

The pitch mechanism 20 may include a hydraulic pipe for supplying hydraulic oil to the pitch cylinder 23A for transmitting driving force, transmitted through the driving force transmission mechanism, to the blade root portion of the wind turbine blade 2. The pitch mechanism 20 may further include an accumulator for hydraulic adjustment and the like.

As in one embodiment illustrated in FIG. 1 and FIG. 2 for example, the pitch actuator 23 may employ a hydraulic pitch cylinder (hydraulic cylinder) 23A that can adjust the pitch angle of the wind turbine blade 2 to be a desired angle with the pitch control valve 22 including a proportional valve (proportional solenoid valve).

As in another embodiment as illustrated in FIG. 3 for example, the pitch actuator 23 may employ an electric pitch motor 23B that can adjust the pitch angle of the wind turbine blade 2 to be a desired angle through control performed with an inverter 24.

The sensor 25 detects the pitch angle (actual pitch angle) of the wind turbine blade 2 in real time, and transmits the resultant detection signal to the controller 42.

The controller 42 according to at least one embodiment of the disclosure is described with reference to FIG. 4.

Figure 4:
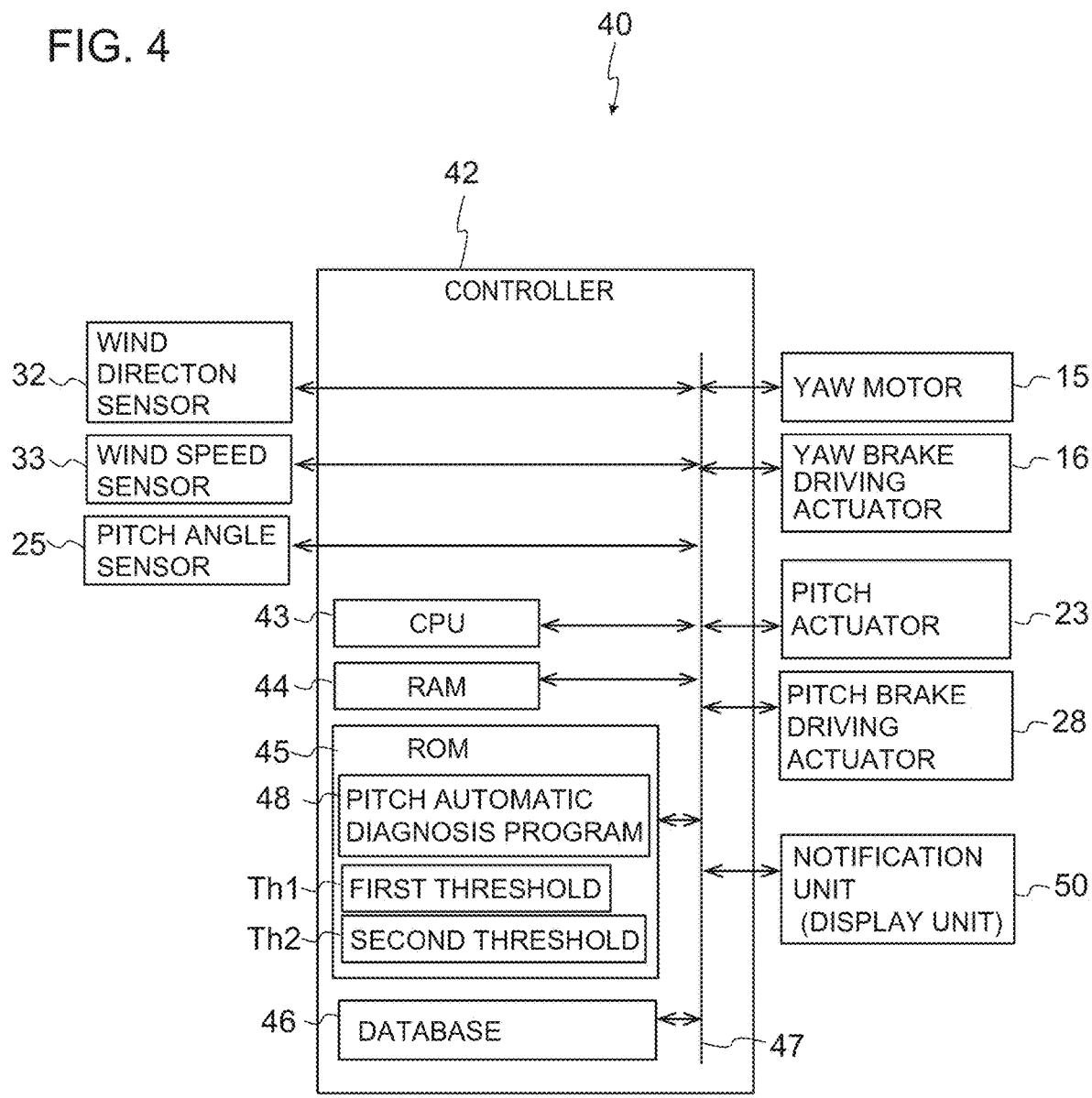
FIG. 4 is a block diagram illustrating a configuration example of a control system in an automatic diagnosis device for a wind turbine power generation facility according to one embodiment.

FIG. 4 is a block diagram illustrating a configuration example of a control system in an automatic diagnosis device for a wind turbine power generation facility according to one embodiment.

As in a nonlimiting example illustrated in FIG. 4 for example, the controller 42 is a computer and may include a CPU 43, a read only memory (ROM) 44 serving as a storage unit that stores various programs executed by the CPU 43 as well as data such as a table, and a random access memory (RAM) 45 that functions as a work area serving as a loading area and a calculation area for the programs to be executed, as well as a hard disk drive (HDD) serving as a unillustrated large capacity storage device, a communication interface for connecting to a communication network, an access unit to which an external storage device is mounted, and the like. In some embodiments, the controller 42 may include a database 46 that stores various parameters related to wind turbine operations. All of these components are connected to each other via a bus 47. Furthermore, the controller 42 may be connected to an input unit (not illustrated), such as a keyboard and a mouse, a display unit (for example, a notification unit 50 described later), such as a liquid crystal display device that displays data, and the like.

A wind direction sensor 32, a wind speed sensor 33, and the pitch angle sensor 25, provided to each wind turbine 1, may respectively transmit wind direction, wind speed, and pitch angle detection signals to the controller 42. The controller 42 may electrically or electronically connected to a yaw motor 15, a yaw brake driving actuator 16, the pitch actuator 23, and a pitch brake driving actuator 28 through the bus 47.

In some embodiments, the ROM 45 stores a pitch automatic diagnosis program 48 for diagnosing soundness of the pitch mechanism 20.

In response to the pitch automatic diagnosis program 48 being read from the ROM 45 and loaded onto and executed on the RAM 44 by the CPU 43, the controller 42 is configured to provide, in a state where the wind turbine rotor 4 is fixed, a pitch control command value (see FIG. 1, FIG.

2, and FIG. 3) to the pitch mechanism 20 to increase or reduce the pitch angle such that the pitch angle reaches a pitch angle target value from a reference angle, acquire, from the sensor 25, the actual pitch angular velocity or the actual pitch angle of the wind turbine blade 2 corresponding to the pitch control command value, and diagnose soundness of the pitch mechanism 20 based on correlation between the acquired actual pitch angular velocity or the acquired actual pitch angle, and the pitch control command value.

In one embodiment, the controller 42 may be a pitch control device 42B arranged in the hub 3 (see, for example, FIG. 1 to FIG. 3). In another embodiment, the controller 42 may be a nacelle control device 42A arranged in the nacelle 5, an operation terminal 42C arranged in the tower 12, or a supervisory control and data acquisition (SCADA) system separated from the wind turbine 1. Communications with the pitch actuator 23 and the sensor 25 may be performed via these elements.

With the configuration described above, in a state where the wind turbine rotor 4 is fixed after rotation, the controller 42 provides the pitch control command value to the pitch mechanism 20 to increase or reduce the pitch angle of the wind turbine blade 2 such that the pitch angle reaches the pitch angle target value from the reference angle, and the actual pitch angular velocity or the actual pitch angle of the wind turbine blade 2 changed in accordance with the pitch control command value is received from the sensor 25. Then, the controller 42 diagnoses the soundness of the pitch mechanism 20 based on the correlation between the acquired actual pitch angular velocity or the acquired actual pitch angle, and the pitch control command value. Thus, the soundness and a sign of abnormality of the pitch mechanism can be quantitatively diagnosed in both of increasing and reducing directions of the pitch angle with respect to the reference angle, based on the correlation between the pitch control command value and the actual pitch angular velocity or the actual pitch angle. When the acquired actual pitch angular velocity or the actual pitch angle does not reach or deviates from the pitch control command value, the pitch control command value is adjusted for correction. In this manner, the soundness of the pitch mechanism 20 can be diagnosed.

In some embodiments, the controller 42 may be configured to fix the wind turbine blade 2 that is a diagnosis target, along a vertical direction including a center of the wind turbine rotor 4 in a front view of the wind turbine 1. Thus, the wind turbine blade 2 that is a diagnosis target may be arranged to have its spanwise direction extending straight upward or downward from the center of the wind turbine rotor 4 in the front view. With this configuration, the controller 42 can diagnose the soundness of the pitch mechanism 20 in a state where the wind turbine blade 2 that is the diagnosis target is fixed along the vertical direction including the center of the wind turbine rotor 4. Thus, the soundness of the pitch mechanism 20 can be diagnosed with the rotational axis 2A of the wind turbine blade 2, related to the pitch angle change, extending along the vertical direction, and thus can be more accurately diagnosed with an influence due to a gravity component attributable to the own weight of the wind turbine blade 2 with respect to the pitch angle change eliminated for example.

Figure 5:
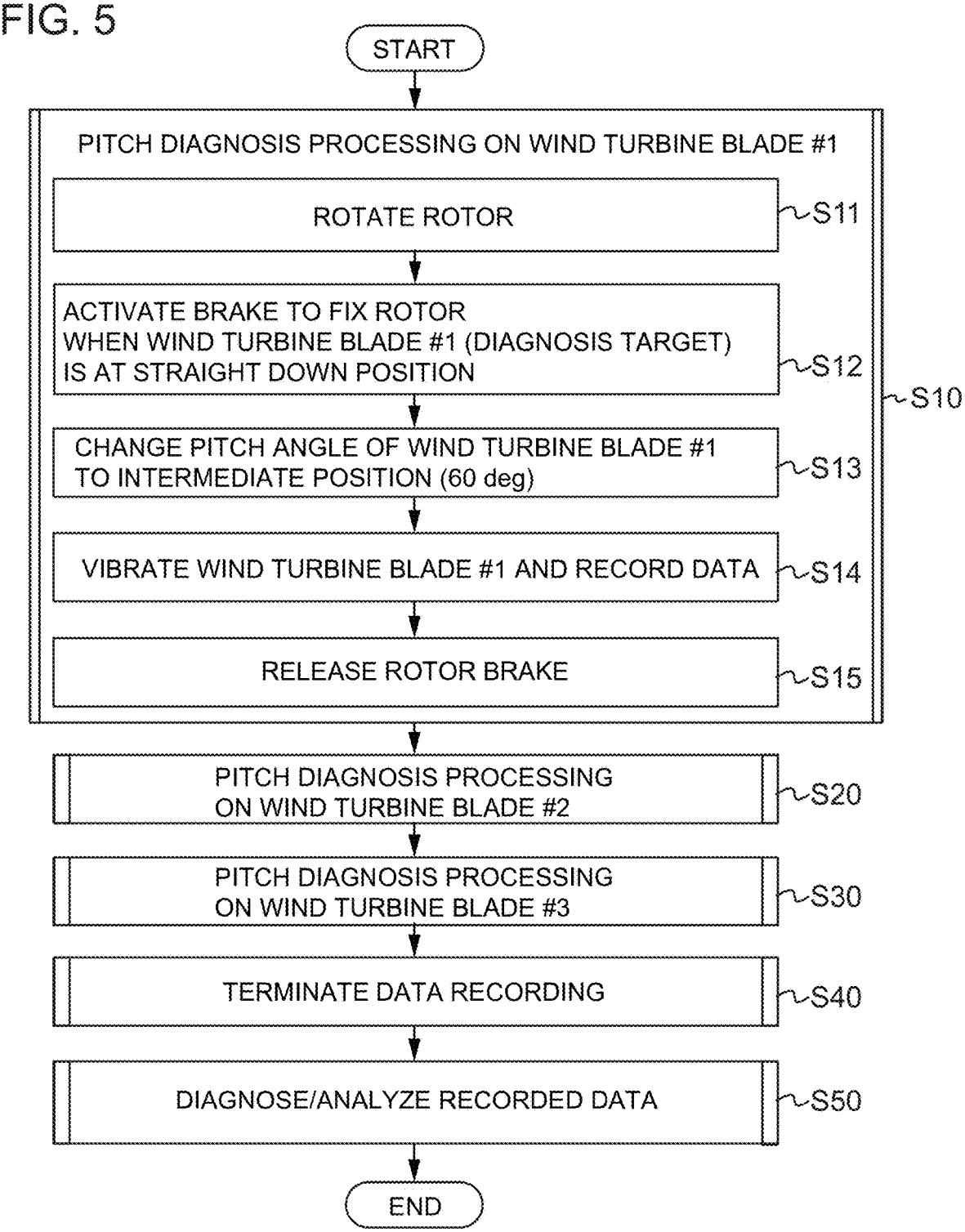
FIG. 5 is a flowchart illustrating pitch diagnosis processing in a method of diagnosing a wind turbine power generation facility according to one embodiment.

In some embodiments, the controller 42 may be configured to provide, to the pitch mechanism 20, the pitch angle target value or the pitch control command value in a form of a sine wave (see, for example, FIG. 2, FIG. 3, and FIG. 5). With this configuration, the pitch angle target value or the pitch control command value is provided to the pitch mechanism 20 in a form of a sine wave, so that a basic waveform that can be easily compared can be used for diagnosing the soundness of the pitch mechanism 20, that is, whether an abnormality is present or a level of the abnormality in both of the increasing and reducing directions of the pitch angle with respect to the reference angle. Note that the pitch control command value may not result in a form of a sine wave.

In some embodiments, the automatic diagnosis device 40 may further include a storage unit (the ROM 45, for example) that stores a first threshold Th1 related to the correlation between the actual pitch angular velocity and the pitch control command value, or a second threshold Th2 related to the correlation between the actual pitch angle and the pitch control command value, as in a nonlimiting example illustrated in FIG. 4 for example.

The controller 42 may be configured to diagnose abnormality when the correlation between the actual pitch angular velocity and the pitch control command value deviates from the first threshold Th1 or when the correlation between the actual pitch angle and the pitch control command value deviates from the second threshold Th2.

For example, the abnormality may be diagnosed when the correlation between the actual pitch angular velocity and the pitch control command value is equal to or larger than the first threshold Th1 based on a reference correlation between the actual pitch angular velocity and the pitch control command value in a state where the pitch mechanism 20 has no abnormality (and thus is in a normal state). Similarly, the abnormality may be diagnosed when the correlation between the actual pitch angle and the pitch control command value is equal to or larger than the second threshold Th2 based on the reference correlation between the actual pitch angle and the pitch control command value in a state where the pitch mechanism 20 has no abnormality.

With this configuration, the soundness of the pitch mechanism 20 in terms of pitch angular velocity can be quantitatively diagnosed more effectively, by determining whether the correlation between the actual pitch angular velocity and the pitch control command value deviates from the first threshold Th1. Furthermore, the soundness of the pitch mechanism 20 in terms of pitch angle can be more effectively diagnosed quantitatively, by determining whether the correlation between the actual pitch angle and the pitch control command value deviates from the second threshold Th2. For example, the first threshold Th1 may be set to be an allowable value of the actual pitch angular velocity with respect to the pitch control command value. Thus, whether the actual pitch angular velocity is within an allowable normal range covering tolerance, assembly error, and the like can be easily diagnosed. For example, the second threshold Th2 may be set to be an allowable value of the actual pitch angle with respect to the pitch control command value. Thus, whether the actual pitch angle is within an allowable normal range covering tolerance, assembly error, and the like can be easily diagnosed.

In some embodiments, the controller 42 may be configured to provide the pitch control command value such that the pitch angle changes toward an amplitude range that is 10% to 50% of an entire pitch angle range between a feather side and a fine side.

For example, if the entire pitch angle range between the feather side and the fine side is 120° (0° to 120° for example), the pitch angle may change with an amplitude of 12° to 60° in the pitch diagnosis processing. In such a case, the reference angle may be set to be at an angular position of 60° that is in the middle of the feather side and the fine side for example. For example, when the pitch angle changes in an amplitude range of 50% of the entire pitch angle range with the reference angle being 60°, the soundness of the pitch mechanism 20 is diagnosed within a range of 30° to 90°.

With this configuration, the controller 42 provides the pitch control command value to the pitch mechanism 20 such that the pitch angle changes toward the amplitude range that is 10% to 50% of the entire pitch angle range between the feather side and the fine side. Thus, the soundness of the pitch mechanism 20 can be diagnosed more simply and within a shorter period of time, compared with a case where the pitch angle changes over the entire pitch angle range between the feather side and the fine side. For example, the soundness of the pitch mechanism 20 can selectively and preferentially be diagnosed for a region involving a relatively high use frequency during the operation, a pitch angle range including a pitch angle involving a relatively high risk of abnormality, and the like.

In some embodiments, the controller 42 may be configured to provide the pitch control command value such that the pitch angle changes toward a frequency range from 0.04 to 0.2 Hz. With this configuration, the soundness of the pitch mechanism 20 is diagnosed with the controller 42 changing the pitch angle toward the frequency range from 0.04 to 0.2 Hz. Thus, the soundness of the pitch mechanism 20 can be diagnosed at any frequency within 0.04 to 0.2 Hz. Thus, behavior as a result of changing the pitch angle at different frequencies can be recognized, whereby the soundness can be diagnosed more accurately.

In some embodiments, the automatic diagnosis device 40 may further include the notification unit 50 that issues a notification related to soundness of the pitch mechanism 20 (see, for example, FIG. 4). The controller 42 may be configured to perform the diagnosis once in every predetermined cycle, and cause, when abnormality of the pitch mechanism 20 of the at least one wind turbine blade 2 is found, the notification unit 50 to issue a notification indicating the abnormality.

The notification unit 50 may issue a notification in a form of sound, light, an image displayed on the display unit, or the like, for example. The predetermined cycle may be set in advance to be any value based on a time elapsed after the operation has started, the number of operation times of the pitch mechanism 20, a cumulative load, and the like. The resultant setting may be stored in the storage unit for example. With this configuration, the soundness of the pitch mechanism 20 is diagnosed once in every predetermined cycle, and when abnormality of the pitch mechanism 20 of the at least one wind turbine blade 2 is found, the notification unit 50 can issue a notification indicating the abnormality.

Next, a method of diagnosing a wind turbine power generation facility according to at least one embodiment of the disclosure is described in detail with reference to FIG. 5 and FIG. 6.

FIG. 5 is a flowchart illustrating a method of diagnosing a wind turbine power generation facility according to one embodiment. FIG. 6 is a schematic view illustrating pitch diagnosis processing in a method of diagnosing a wind turbine power generation facility according to one embodiment.

Figure 6:
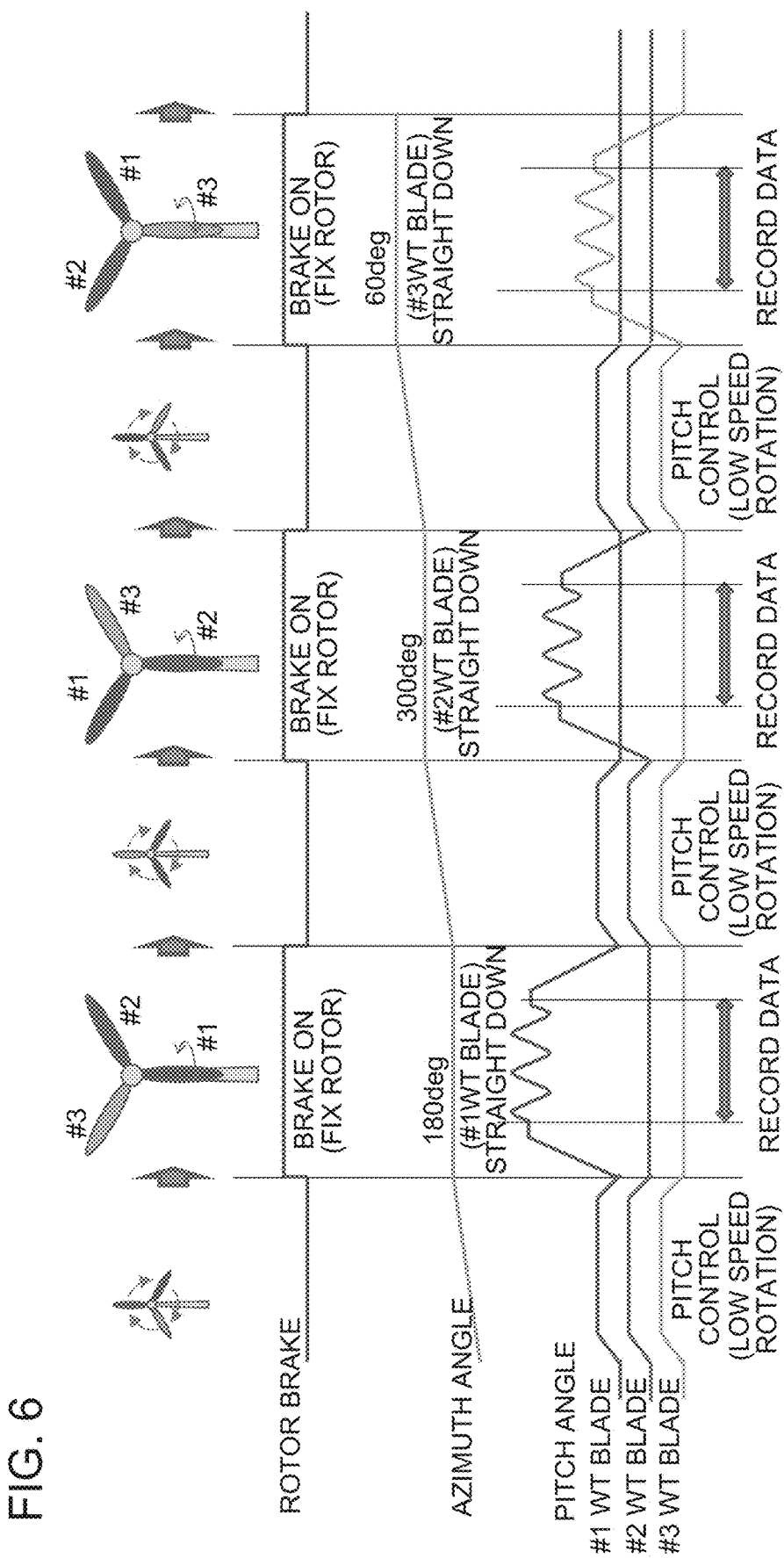
FIG. 6 is a schematic view illustrating pitch diagnosis processing in a method of diagnosing a wind turbine power generation facility according to one embodiment.

As in a nonlimiting example illustrated in FIG. 5 and FIG. 6, a method of diagnosing a wind turbine power generation facility according to at least one embodiment of the disclosure includes, for executing (step S10) pitch diagnosis processing on a wind turbine blade 2 (#1) that is a diagnosis target: rotating (step S11) and fixing (step S12) a wind turbine rotor 4 including at least one wind turbine blade 2; providing (step S13), in a state where the wind turbine rotor 4 is fixed, a pitch control command value, based on a pitch angle target value, to a pitch mechanism 20 that changes a pitch angle of the wind turbine blade 2, to increase or reduce the pitch angle from a reference angle; acquiring (step S14) an actual pitch angular velocity or an actual pitch angle of the wind turbine blade 2 corresponding to the pitch control command value; and diagnosing (step S50) soundness of the pitch mechanism 20 based on correlation between the acquired actual pitch angular velocity or the acquired actual pitch angle, and the pitch control command value.

For example, step S11 may include releasing the main shaft brake 10 serving as brake for the wind turbine rotor 4, so that the wind turbine rotor 4 is rotated by wind power.

For example, step S12 includes activating the main shaft brake 10 at the timing when the wind turbine blade 2 (#1) that is a diagnosis target is arranged straight below the hub 3, so that the wind turbine rotor 4 is fixed.

After the pitch angle of the wind turbine blade 2 (#1) is shifted to the reference angle (step S13), in step S14, the wind turbine blade 2 is vibrated from the reference angle, and the actual pitch angular velocity or the actual pitch angle of the wind turbine blade 2, corresponding to the pitch control command value, is acquired through the sensor 25.

Step S50 include diagnosing the soundness of the pitch mechanism 20 based on correlation between the acquired actual pitch angular velocity or the acquired actual pitch angle, and the pitch control command value.

With the method described above, in a state where the wind turbine rotor 4 is fixed after rotation, the pitch control command value, based on the pitch angle target value, is provided to the pitch mechanism 20 to increase or reduce the pitch angle of the wind turbine blade 2 from the reference angle, and the actual pitch angular velocity or the actual pitch angle of the wind turbine blade 2 changed in accordance with the pitch control command value acquired. Then, the soundness of the pitch mechanism 20 is diagnosed based on the correlation between the acquired actual pitch angular velocity or the acquired actual pitch angle, and the pitch control command value. Thus, the soundness and a sign of abnormality of the pitch mechanism can be quantitatively diagnosed in both of increasing and reducing directions of the pitch angle with respect to the reference angle, based on the correlation between the pitch control command value and the acquired actual pitch angular velocity or the acquired actual pitch angle. When the acquired actual pitch angular velocity or the actual pitch angle does not reach or deviates from the pitch control command value, the pitch control command value is adjusted for correction. In this manner, the soundness of the pitch mechanism 20 can be diagnosed.

When the wind turbine blade 2 that is a diagnosis target is arranged at the diagnosis position in advance, the step of rotating the wind turbine rotor 4 after the inspection has started can be omitted.

An azimuth angle of the wind turbine blade 2 that is a diagnosis target at the time of diagnosis may be set to be any angle as long as a consistency condition can be satisfied with the wind turbine blade 2 arranged to be at the same azimuth angle every time the diagnosis is performed.

In some embodiments, step S12 of fixing the wind turbine rotor 4 may include fixing the wind turbine blade 2 that is a diagnosis target, along a vertical direction including a center of the wind turbine rotor 4 in a front view of the wind turbine 1. Thus, the wind turbine blade 2 (#1) that is a diagnosis target may be arranged to have its spanwise direction extending straight upward or downward from the center of the wind turbine rotor 4 (center of the hub 3) in the front view.

With the wind turbine blade 2 thus fixed, the soundness of the pitch mechanism 20 can be diagnosed in a state where the wind turbine blade 2 that is the diagnosis target is fixed along the vertical direction including the center of the wind turbine rotor 4. Thus, the soundness of the pitch mechanism 20 can be diagnosed with the rotational axis 2A of the wind turbine blade 2 related to the pitch angle change extending along the vertical direction, and thus can be more accurately diagnosed with an influence due to a gravity component attributable to the own weight of the wind turbine blade 2 with respect to the pitch angle change eliminated for example.

In some embodiments, the pitch angle target value or the pitch control command value may be provided in a form of a sine wave.

For example, when the wind turbine blade 2 (#1) is vibrated in step S14, the pitch angle target value or the pitch control command value in a form of a sine wave is provided to the pitch control valve 22 or the inverter 24. Thus, the pitch angle target value or the pitch control command value is provided to the pitch mechanism 20 in a form of a sine wave, so that a basic waveform that can be easily compared can be used for diagnosing the soundness of the pitch mechanism 20, that is, whether an abnormality is present or a level of the abnormality in both of the increasing and reducing directions of the pitch angle with respect to the reference angle. Note that the pitch control command value may not result in a form of a sine wave.

The method of diagnosing a wind turbine power generation facility according to some embodiments may further include a step of setting a first threshold Th1 related to the correlation between the actual pitch angular velocity and the pitch control command value, and step S50 of diagnosing may include diagnosing abnormality when the correlation between the actual pitch angular velocity and the pitch control command value deviates from the first threshold Th1.

With this method, the soundness of the pitch mechanism 20 in terms of pitch angular velocity can be more effectively diagnosed quantitatively, by determining whether the correlation between the actual pitch angular velocity and the pitch control command value deviates from the first threshold Th1. For example, the first threshold Th1 may be set to be an allowable value (or an allowable range) or the like of the actual pitch angular velocity with respect to the pitch control command value. Thus, whether the actual pitch angular velocity is within an allowable normal range covering tolerance, assembly error, and the like can be easily diagnosed.

The method of diagnosing a wind turbine power generation facility according to some embodiments may further include a step of setting a second threshold Th2 related to the correlation between the actual pitch angle and the pitch control command value, and step S50 of diagnosing may include diagnosing abnormality when the correlation between the actual pitch angle and the pitch control command value deviates from the second threshold Th2.

With this method, the soundness of the pitch mechanism 20 in terms of pitch angle can be more effectively diagnosed quantitatively, by determining whether the correlation between the actual pitch angle and the pitch control command value deviates from the second threshold Th2. For example, the second threshold Th2 may be set to be an allowable value (or an allowable range) or the like of the actual pitch angle with respect to the pitch control command value. Thus, whether the actual pitch angular is within an allowable normal range covering tolerance, assembly error, and the like can be easily diagnosed.

In some embodiments, step S14 of providing the pitch control command value may include providing the pitch control command value such that the pitch angle changes toward an amplitude range that is 10% to 50% of an entire pitch angle range between a feather side and a fine side.

With this method, the pitch control command value is provided to the pitch mechanism 20 such that the pitch angle changes toward an amplitude range that is 10% to 50% of the entire pitch angle range between the feather side and the fine side. Thus, the soundness of the pitch mechanism 20 can be diagnosed more simply and within a shorter period of time, compared with a case where the pitch angle changes over the entire pitch angle range between the feather side and the fine side. For example, the soundness of the pitch mechanism 20 can selectively and preferentially be diagnosed for a region involving a relatively high use frequency during the operation, a pitch angle range including a pitch angle involving a relatively high risk of abnormality, and the like.

In some embodiments, step S14 of providing the pitch control command value may include providing the pitch control command value such that the pitch angle changes toward a frequency range from 0.04 to 0.2 Hz.

With this method, the soundness of the pitch mechanism 20 is diagnosed with the pitch angle changed toward the frequency range from 0.04 to 0.2 Hz. Thus, the soundness of the pitch mechanism 20 can be diagnosed at any frequency within 0.04 to 0.2 Hz. Thus, for example, behavior as a result of changing the pitch angle at different frequencies can be recognized, whereby the soundness can be diagnosed more accurately.

In some embodiments, step S14 of providing the pitch control command value may include providing the pitch control command value such that the pitch angle changes toward a cycle range from 5 to 25 seconds.

With this method, the soundness of the pitch mechanism 20 is diagnosed with the pitch angle changed toward the cycle range from 5 to 25 seconds. Thus, the soundness of the pitch mechanism 20 can be diagnosed at any cycle within 5 to 25 seconds. Thus, for example, behavior as a result of changing the pitch angle at different cycles can be recognized, whereby the soundness can be diagnosed more accurately.

As in an example illustrated in FIG. 5 and FIG. 6, after step S14 described above, a rotor brake (the main shaft brake 10) may be released (step S15), and the wind turbine rotor 4 is rotated until a wind turbine blade 2 (#2) that is the next diagnosis target is arranged straight below the hub 3. Thus, the pitch diagnosis processing may be executed on the wind turbine blade 2 (#2) (step S20). After step S20, a wind turbine blade 2 (#3) that is the next diagnosis target may be arranged straight below the hub 3, and the pitch diagnosis processing may be executed on the wind turbine blade 2 (#3) (step S30). Then, recording of data may be terminated (step S40) when the pitch diagnosis processing is completed for all of the wind turbine blades 2 (#1 to #3), and the processing may be terminated when the diagnosis and analysis is executed (step S50) on the recorded data.

Figure 7A:
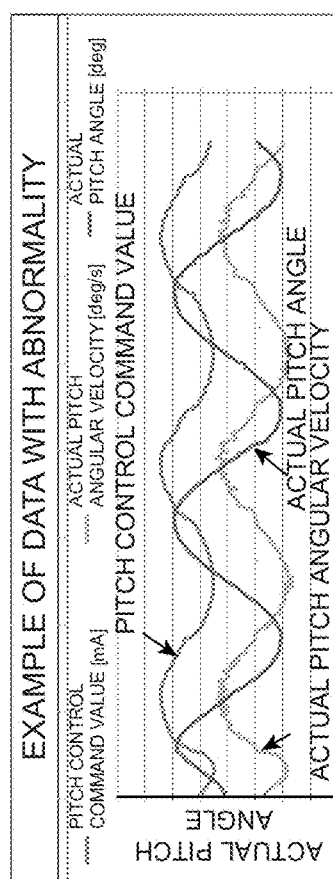
FIG. 7A and FIG. 7B are schematic views illustrating an example of input/output data for the pitch diagnosis processing in a method of diagnosing a wind turbine power generation facility according to one embodiment, FIG. 7A illustrating a sound state and FIG. 7B illustrating an abnormal state.
Figure 7A:
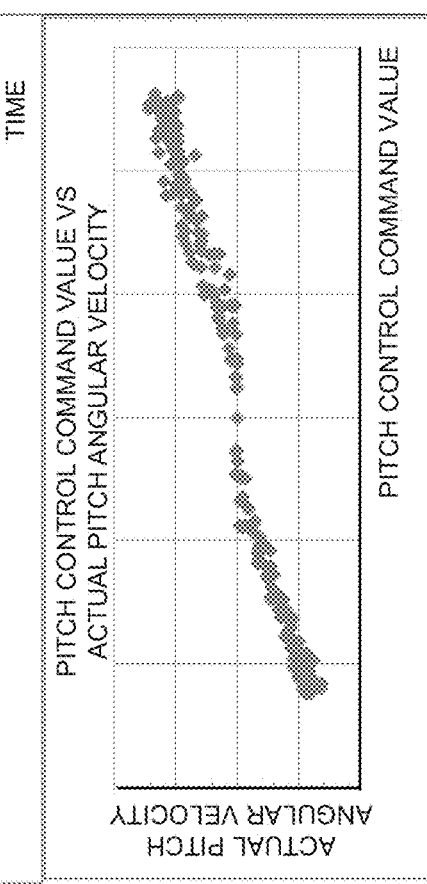
Figure 7B:
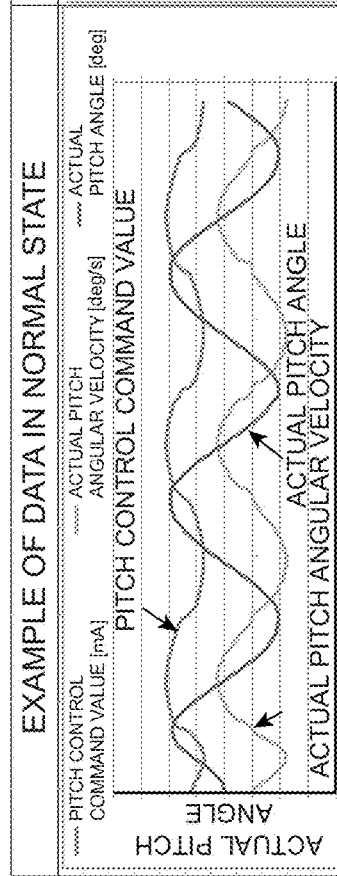
Figure 7B:
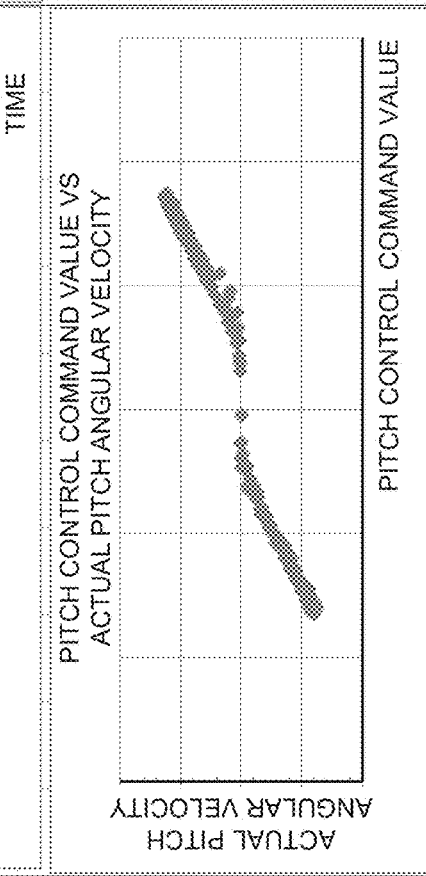

FIG. 7A and FIG. 7B illustrate an example where the pitch mechanism 20 is diagnosed to have abnormality with the diagnosis described above, in comparison with the wind turbine blade 2 without abnormality (case where the pitch mechanism 20 is sound).

FIG. 7A and FIG. 7B are schematic views illustrating an example of input/output data for the pitch diagnosis processing in a method of diagnosing a wind turbine power generation facility according to one embodiment, FIG. 7A illustrating a sound state and FIG. 7B illustrating an abnormal state.

It can be seen in FIG. 7B that the wind turbine blade 2 diagnosed to be abnormal has relationship or correlation between the pitch control command value and the actual pitch angular velocity laterally spreading more than that in FIG. 7A illustrating the normal state.

According to at least one embodiment of the disclosure described above, the soundness and a sign of abnormality of the pitch mechanism 20 of the wind turbine blade 2 can be quantitatively diagnosed.

It should be noted that the disclosure is not limited to the embodiments described above and also includes embodiments with modifications to the embodiments described above and a combination of these embodiments.

The invention claimed is:

1. A method of diagnosing a wind turbine power generation facility, the method comprising the steps of:
    preparing an automatic diagnosis device including:
        a wind turbine rotor that includes at least one wind turbine blade,
        a pitch mechanism that changes a pitch angle of the at least one wind turbine blade,
        a sensor that acquires an actual pitch angular velocity or an actual pitch angle of the at least one wind turbine blade, and
        a controller that controls driving of at least the pitch mechanism and the wind turbine rotor;
    rotating and fixing the wind turbine rotor;
    providing, in a state where the wind turbine rotor is fixed, a pitch control command value to a pitch mechanism to increase or reduce the pitch angle such that the pitch angle reaches a pitch angle target value from a reference angle;
    acquiring, from the sensor, the actual pitch angular velocity or the actual pitch angle of the at least one wind turbine blade corresponding to the pitch control command value; and
    diagnosing soundness of the pitch mechanism based on correlation between the acquired actual pitch angular velocity or the acquired actual pitch angle, and the pitch control command value.

2. The method of diagnosing the wind turbine power generation facility according to claim 1, wherein the step of fixing the wind turbine rotor includes fixing the at least one wind turbine blade that is a diagnosis target, along a vertical direction including a center of the wind turbine rotor.

3. The method of diagnosing the wind turbine power generation facility according to claim 1, wherein the pitch angle target value or the pitch control command value is provided in a form of a sine wave.

4. The method of diagnosing the wind turbine power generation facility according to claim 1, further comprising a step of setting a first threshold related to the correlation between the actual pitch angular velocity and the pitch control command value,
    wherein the step of diagnosing includes diagnosing abnormality when the correlation between the actual pitch angular velocity and the pitch control command value deviates from the first threshold.

5. The method of diagnosing the wind turbine power generation facility according to claim 1, further comprising a step of setting a second threshold related to the correlation between the actual pitch angle and the pitch control command value,
    wherein the step of diagnosing includes diagnosing abnormality when the correlation between the actual pitch angle and the pitch control command value deviates from the second threshold.

6. The method of diagnosing the wind turbine power generation facility according to claim 1, wherein the step of providing the pitch control command value includes providing the pitch control command value such that the pitch angle changes toward an amplitude range that is 10% to 50% of an entire pitch angle range between a feather side and a fine side.

7. The method of diagnosing the wind turbine power generation facility according to claim 1, wherein the step of providing the pitch control command value includes providing the pitch control command value such that the pitch angle changes toward a frequency range from 0.04 to 0.2 Hz.

8. The method of diagnosing the wind turbine power generation facility according to claim 1, wherein the step of providing the pitch control command value includes providing the pitch control command value such that the pitch angle changes toward a cycle range from 5 to 25 seconds.

9. An automatic diagnosis device for a wind turbine power generation facility that comprises:
    a wind turbine rotor including at least one wind turbine blade; and
    a pitch mechanism that changes a pitch angle of the at least one wind turbine blade,
    the automatic diagnosis device comprising:
    a sensor that acquires an actual pitch angular velocity or an actual pitch angle of the at least one wind turbine blade; and
    a controller that controls driving of at least the pitch mechanism and the wind turbine rotor,
    wherein the controller is configured to
        provide, in a state where the wind turbine rotor is fixed, a pitch control command value to the pitch mechanism to increase or reduce the pitch angle such that the pitch angle reaches a pitch angle target value from a reference angle,
        acquire, from the sensor, the actual pitch angular velocity or the actual pitch angle of the at least one wind turbine blade corresponding to the pitch control command value, and
        diagnose soundness of the pitch mechanism based on correlation between the acquired actual pitch angular velocity or the acquired actual pitch angle, and the pitch control command value.

10. The automatic diagnosis device for the wind turbine power generation facility according to claim 9, wherein the controller is configured to fix the at least one wind turbine blade that is a diagnosis target, along a vertical direction including a center of the wind turbine rotor.

11. The automatic diagnosis device for the wind turbine power generation facility according to claim 9, wherein the controller is configured to provide, to the pitch mechanism, the pitch angle target value or the pitch control command value in a form of a sine wave.

12. The automatic diagnosis device for the wind turbine power generation facility according to claim 9, further comprising a storage unit that stores a first threshold related to the correlation between the actual pitch angular velocity and the pitch control command value, or a second threshold related to the correlation between the actual pitch angle and the pitch control command value, wherein the controller is configured to diagnose abnormality when the correlation between the actual pitch angular velocity and the pitch control command value deviates from the first threshold or when the correlation between the actual pitch angle and the pitch control command value deviates from the second threshold.

13. The automatic diagnosis device for the wind turbine power generation facility according to claim 9, wherein the controller is configured to provide the pitch control command value such that the pitch angle changes toward an amplitude range that is 10% to 50% of an entire pitch angle range between a feather side and a fine side.

14. The automatic diagnosis device for the wind turbine power generation facility according to claim 9, wherein the controller is configured to provide the pitch control command value such that the pitch angle changes toward a frequency range from 0.04 to 0.2 Hz.

15. The automatic diagnosis device for the wind turbine power generation facility according to claim 9, further comprising a notification unit that issues a notification related to the soundness of the pitch mechanism,
wherein the controller is configured to perform the diagnosis of the soundness once in every predetermined cycle, and cause, when abnormality of the pitch mechanism of the at least one wind turbine blade is found, the notification unit to issue a notification indicating the abnormality.

* * * * *